United States Patent
Li et al.

(10) Patent No.: US 9,807,588 B2
(45) Date of Patent: Oct. 31, 2017

(54) WIRELESS CONTROLLER COMMUNICATION METHOD AND WIRELESS CONTROLLER

(71) Applicant: Huawei Technologies Co., Ltd., Shenzhen (CN)

(72) Inventors: You Li, Shenzhen (CN); Kun Zeng, Shenzhen (CN); Yao Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 14/852,345

(22) Filed: Sep. 11, 2015

(65) Prior Publication Data

US 2016/0007186 A1 Jan. 7, 2016

Related U.S. Application Data

(63) Continuation of application No. PCT/CN2014/074461, filed on Mar. 31, 2014.

(30) Foreign Application Priority Data

Mar. 29, 2013 (CN) .......................... 2013 1 0108304

(51) Int. Cl.
*H04W 84/12* (2009.01)
*H04W 8/06* (2009.01)
(Continued)

(52) U.S. Cl.
CPC .............. *H04W 8/06* (2013.01); *H04W 8/26* (2013.01); *H04W 48/02* (2013.01); *H04W 48/16* (2013.01);
(Continued)

(58) Field of Classification Search
CPC ....... H04W 8/06; H04W 8/26; H04W 76/025; H04W 76/021; H04W 48/02; H04W 48/16; H04W 84/20; H04W 76/02
See application file for complete search history.

(56) References Cited

U.S. PATENT DOCUMENTS

| 7,996,894 B1 * | 8/2011 | Chen ...................... H04L 63/02 370/389 |
| 8,224,964 B1 * | 7/2012 | Fredrickson ...... H04L 29/08729 709/227 |

(Continued)

FOREIGN PATENT DOCUMENTS

| CN | 101478743 A | 7/2009 |
| CN | 101682415 A | 3/2010 |
| WO | WO 2012050387 A2 | 4/2012 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401, V12.0.0, pp. 1-290, 3rd Generation Partnership Project, Valbonne, France (Mar. 2013).

*Primary Examiner* — Andrew Lee
(74) *Attorney, Agent, or Firm* — Leydig, Voit & Mayer, Ltd.

(57) ABSTRACT

A wireless controller communication method and a wireless controller are provided. The method comprises: receiving, by the wireless controller, an identifier and address information allocated to the wireless controller by a network management device; registering, by the wireless controller, attribute information of a slave control device belonging to the wireless controller with the network management device, wherein the network management device establishes a mapping relationship between the wireless controller and the slave control device; searching for address information of the slave control device based on the mapping relationship when the wireless controller needs to communicate with the slave control device; and establishing, by the wireless controller, communication with the slave control device based on the address information of the slave control device.

20 Claims, 10 Drawing Sheets

(51) Int. Cl.
*H04W 8/26* (2009.01)
*H04W 76/02* (2009.01)
*H04W 48/02* (2009.01)
*H04W 48/16* (2009.01)
*H04W 84/20* (2009.01)

(52) U.S. Cl.
CPC ....... *H04W 76/021* (2013.01); *H04W 76/025* (2013.01); *H04W 84/20* (2013.01)

(56) References Cited

U.S. PATENT DOCUMENTS

| | | | | |
|---|---|---|---|---|
| 8,416,763 | B1* | 4/2013 | Montini | H04J 3/0667 370/350 |
| 2007/0001853 | A1* | 1/2007 | Otranen | G06K 7/0008 340/572.1 |
| 2007/0253437 | A1* | 11/2007 | Radhakrishnan | G06F 15/16 370/401 |
| 2008/0311909 | A1 | 12/2008 | Taaghol et al. | |
| 2010/0174270 | A1* | 7/2010 | Charlez | A61M 1/0013 604/540 |
| 2011/0055516 | A1* | 3/2011 | Willis | G01B 31/31836 712/2 |
| 2011/0295942 | A1* | 12/2011 | Raghunath | H04L 45/00 709/203 |
| 2012/0246255 | A1* | 9/2012 | Walker | H04W 60/005 709/208 |
| 2013/0070596 | A1 | 3/2013 | Yeh et al. | |
| 2013/0208662 | A1 | 8/2013 | Lee et al. | |
| 2014/0010172 | A1* | 1/2014 | Wei | H04W 76/023 370/329 |
| 2015/0156067 | A1* | 6/2015 | Tung | H04L 61/2015 709/209 |
| 2015/0271849 | A1* | 9/2015 | Gao | H04B 15/00 370/338 |
| 2016/0150466 | A1* | 5/2016 | Jung | H04W 8/005 455/434 |

* cited by examiner

WIRELESS CONTROLLER COMMUNICATION METHOD AND WIRELESS CONTROLLER

CROSS-REFERENCE TO RELATED APPLICATIONS

This application is a continuation of International Patent Application No. PCT/CN2014/074461, filed on Mar. 31, 2014, which claims priority to Chinese Patent Application No. 201310108304.5 filed on Mar. 29, 2013, both of which are hereby incorporated by reference in their entireties.

FIELD OF THE TECHNOLOGY

The present application relates to the field of wireless communication technology, and in particular to a communication method for a wireless controller and a wireless controller.

BACKGROUND

Under the core packet architecture of long term evolution (LTE) network, mobility management entity (MME) or serving GPRS support node (SGSN) is the control entity in the network, and realizes the control function of LTE network and control function of 3G network correspondingly. As can be learned from definitions of related protocols, corresponding signaling interaction is required between a new MME and an old MME or between a MME and a SGSN, to realize corresponding network control function.

The attach process and tracking area update (TAU) process are taken for example respectively, to illustrate the necessity of signaling interaction between control entities. For example, in the Attach process, the new MME sends the signaling to the old MME to obtain the international mobile subscriber identification number (IMSI) of the user; in the TAU process, the new MME obtains information, such as mobility management (MM) context of user, bearer context, from the SGSN.

In the existing network, the deployment of MME and SGSN are usually relatively independent from each other. Accordingly, the MME and SGSN have independent IP addresses or unique uniform resource locators (URLs). Thus, the signaling interaction between MMEs, between MME and SGSN, and between SGSNs may use corresponding IP address or URL directly.

At present, the architecture with separated controller and bearer is put forward in the evolution of new technology, for example, the bearer demand of user or operator is responded to through a node device which is able to control the base station and the gateway of operator, and the node device may be realized through wireless controller. Base stations under multi-standard may be deployed, so that the Wireless Controller controls and utilizes the base stations and/or access points with different standards in a same region to satisfy the specific demand of user or operator in terms of bandwidth, delay or the like.

To manage the behaviors of base station and UE operating with a specific radio access technology (RAT), Wireless Controller needs to be provided with a management function corresponding to the RAT, for example, the management functions of LTE, universal mobile telecommunications system (UMTS) and wifi.

It is necessary to carry out the signaling interaction between Wireless Controllers, to allow Wireless Controller to realize the control ability of various RATs. However, in conventional technology, there is no solution for implementing the signaling interaction in the Wireless Controllers and for carrying out the signaling interaction between corresponding RAT control modules.

SUMMARY

A communication method for a wireless controller and a wireless controller are provided according to embodiments of the disclosure, to implement signaling interaction between wireless controllers and signaling interaction between a wireless controller and RAT control modules managed by the wireless controller.

To solve the technical problem, the following technical solutions are provided according to embodiments of the disclosure.

In one aspect, a communication method for a wireless controller is provided, including:

receiving, by the wireless controller, an identifier and address information allocated to the wireless controller by a network management device;

registering, by the wireless controller, attribute information of a slave control device belonging to the wireless controller with the network management device, where the network management device establishes a mapping relationship between the wireless controller and the slave control device;

searching for address information of the slave control device based on the mapping relationship when the wireless controller needs to communicate with the slave control device; and establishing, by the wireless controller, communication with the slave control device based on the address information of the slave control device.

In combination with the above aspect, in a first possible implementation, after the network management device establishes the mapping relationship between the wireless controller and the slave control device, the method further includes:

receiving and storing, by the wireless controller, a first mapping relationship corresponding to the wireless controller sent from the network management device.

In combination with the above aspect, and/or the first possible implementation, in a second possible implementation, the method further includes:

in a case that the wireless controller fails to find the address information of the slave control device by searching in the first mapping relationship, sending a query request to the network management device for requesting the network management device to send the address information of the slave control device.

In combination with the above aspect, and/or the first possible implementation, and/or the second possible implementation, in a third possible implementation, after the network management device establishes the mapping relationship between the wireless controller and the slave control device, the method further includes:

receiving and storing, by the wireless controller, a second mapping relationship corresponding to another wireless controller in the network sent by the network management device.

In one aspect, the slave control device includes a slave wireless access control module or a slave wireless controller.

In one aspect, the slave control device comprises a plurality of slave wireless access control modules, the slave wireless access control modules are loaded on a same server, and the wireless controller to which the slave wireless access control modules belong controls the server.

In one aspect, the slave control device comprises a plurality of slave wireless access control modules, the slave wireless access control modules are loaded on independent servers respectively, and the wireless controller to which the slave wireless access control modules belong controls the independent servers in a master-slave mode.

In another aspect, a wireless controller is provided, including:

an information receiving module, configured to receive an identifier and address information allocated to the wireless controller by a network management device;

a register module, configured to registers attribute information of a slave control device belonging to the wireless controller with the network management device, wherein the network management device establishes a mapping relationship between the wireless controller and the slave control device;

a communication address lookup module, configured to search for address information of the slave control device based on the mapping relationship, when communicating with the slave control device; and a communication module, configured to establish communication with the slave control device based on the address information of the slave control device.

In combination with the above aspect, in a first possible implementation, the wireless controller further includes:

a first receiver module, configured to receive a first mapping relationship corresponding to the wireless controller sent by the network management device; and a first storage module, configured to store the first mapping relationship.

In a second possible implementation, the wireless controller further includes:

a query requesting module, configured to send a query request to the network management device for requesting the network management device to send the address information of the slave control device in a case that the wireless controller fails to find the address information of the slave control device by searching in the first mapping relationship; and a second receiver module, configured to receive the address information of the slave control device sent by the network management device.

In a third possible implementation, the wireless controller further includes:

a third receiver module, configured to receive a second mapping relationship corresponding to another wireless controller in the network sent by the network management device; and a second storage module, configured to store the second mapping relationship.

In one aspect, the slave control device comprises a slave wireless access control module or a slave wireless controller.

In one aspect, the slave control device comprises a plurality of slave wireless access control modules, the slave wireless access control modules are loaded on a same server, and the wireless controller to which the slave wireless access control modules belong controls the server.

In one aspect, the slave control device comprises a plurality of slave wireless access control modules, the slave wireless access control modules are loaded on independent servers respectively, and the wireless controller to which the slave wireless access control modules belong controls the independent servers in the master-slave mode.

In yet another aspect, a wireless controller is provided, which includes:

a receiver circuit configured to receive an identifier and address information allocated to the wireless controller by a network management device; and a processor, configured to:

register attribute information of a slave control device belonging to the wireless controller with the network management device, wherein the network management device establishes a mapping relationship between the wireless controller and the slave control device;

search for address information of the slave control device based on the mapping relationship, when communicating with the slave control device; and establish communication with the slave control device based on the address information of the slave control device.

In combination with the above aspect, and/or the first possible implementation, in a second possible implementation, the receiver circuit is further configured to receive a first mapping relationship corresponding to the wireless controller sent by the network management device; and the wireless controller further includes a storage configured to store the first mapping relationship.

In combination with the above aspect, and/or the first possible implementation, and/or the second possible implementation, in a third possible implementation, the processor is further configured to send a query request to the network management device for requesting the network management device to send the address information of the slave control device in a case that the wireless controller fails to find the address information of the slave control device by searching in the first mapping relationship; and the receiver circuit is further configured to receive the address information of the slave control device sent by the network management device.

In combination with the above aspect, the receiver circuit is further configured to receive a second mapping relationship corresponding to another wireless controller in the network sent by the network management device; and the storage is further configured to store the second mapping relationship.

In one aspect, the slave control device comprises a slave wireless access control module or a slave wireless controller.

In one aspect, the slave control device includes a plurality of slave wireless access control modules:

the slave wireless access control modules are loaded on a same server, and the wireless controller to which the slave wireless access control modules belong controls the server; or the slave wireless access control modules are loaded on independent servers respectively, and the wireless controller to which the slave wireless access control modules belong controls the independent servers in the master-slave mode.

According to the embodiments of the disclosure, the network management device establishes the mapping relationship for the wireless controller accessing the network, the mapping relationship represents a connection between the wireless controller and the slave RAT control module or slave radio access controller belonging to the wireless controller, and the wireless controller obtains address information of any RAT control module or radio access controller through the mapping relationship, thus communicates with the corresponding RAT control module or radio access controller.

BRIEF DESCRIPTION OF THE DRAWINGS

In order to illustrate the technical solutions according to the embodiments of the disclosure or in the conventional technology more clearly, the drawings to be used in the description of the embodiments or the conventional technology are described briefly hereinafter. Apparently, other drawings may be obtained by those skilled in the art according to those drawings without creative effort.

DETAILED DESCRIPTION OF THE EMBODIMENTS

Figure 1:
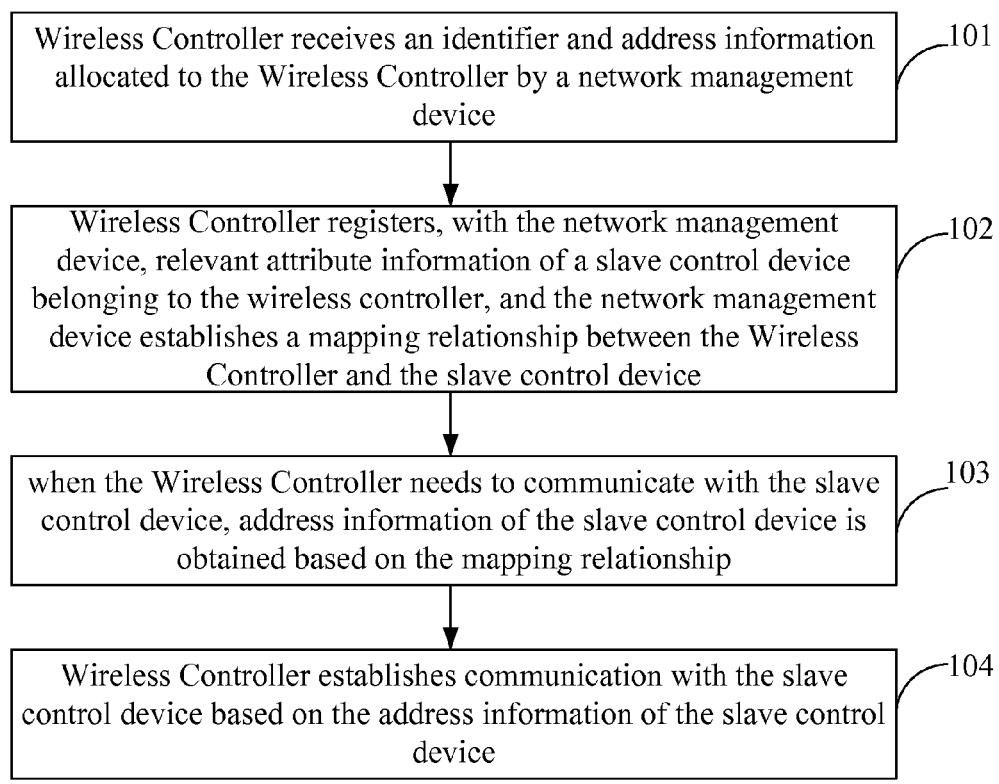
FIG. 1 is a flowchart of a communication method for a wireless controller according to the disclosure.

Referring to FIG. 1, FIG. 1 is a flowchart of a communication method for a wireless controller according to the disclosure. The method embodiment may include the following execution steps 101-104.

In step 101, Wireless Controller receives an identifier and address information allocated to the Wireless Controller by a network management device.

In this step, after Wireless Controller accesses a network, the network management device assigns an ID and an address (for example, IP address) to Wireless Controller.

The network management device may be a home subscriber server (HSS) entity, a radio environment map (REM) entity or operations and maintenance (OM) entity.

In Step 102, the Wireless Controller registers, with the network management device, relevant attribute information of a slave control device belonging to the wireless controller, and the network management device establishes a mapping relationship between the Wireless Controller and the slave control device.

In this step, the slave control device belonging to the wireless controller may include a slave RAT control module or a slave Wireless Controller. The Wireless Controller accessing the network provides the network management device with relevant information about the slave RAT control module or the slave Wireless Controller, and registers a correspondence relationship between the Wireless Controller and the slave RAT control module or the slave Wireless Controller with the network management device. Based on the correspondence relationship, the network management device establishes a mapping relationship between the Wireless Controller and the slave RAT control module or between the Wireless Controller and the slave Wireless Controller respectively. Based on the mapping relationship, the network management device may establish a mapping table, and the mapping relationship is shown as the mapping table diagrams in Table 1 and Table 2. In Table 1 and Table 2, MME represents a LTE control module, SGSN represents a 3G control module, and AC represents a WLAN control module.

TABLE 1

Diagram of a mapping table in the network management device
Wireless Controller ID
IP address

| Index1 | MME1 ID |
| Index2 | MME2 ID |
| Index3 | SGSN ID |
| Index4 | AC ID |

TABLE 2

Diagram of another mapping table in the network management device
Wireless Controller ID
IP address

| Index1 | slave Wireless Controller 1 ID |
| Index2 | slave Wireless Controller 2 ID |

In step 103, when the Wireless Controller needs to communicate with the slave control device, address information of the slave control device is obtained based on the mapping relationship.

In this step, when the Wireless Controller needs to communicate with the slave control device, for example, any RAT control module or any Wireless Controller in the network conducts communication, address information of the RAT control module or Wireless Controller at the opposite side of communication may be obtained through the mapping relationship established by the network management device.

The network management device stores mapping relationships of all the Wireless Controllers in the corresponding network.

In step 104, the Wireless Controller establishes communication with the slave control device based on the address information of the slave control device.

In the embodiment of the disclosure, the network management device establishes the mapping relationship for the Wireless Controller accessing the network, represents a connection between the Wireless Controller and the slave RAT control module belonging to the Wireless Controller or between the Wireless Controller and the slave RAT controller belonging to the Wireless Controller using the mapping relationship, and the Wireless Controller obtains address information of any RAT control module or RAT controller through the mapping relationship, thus communicates with the corresponding RAT control module or RAT controller.

Figure 2:
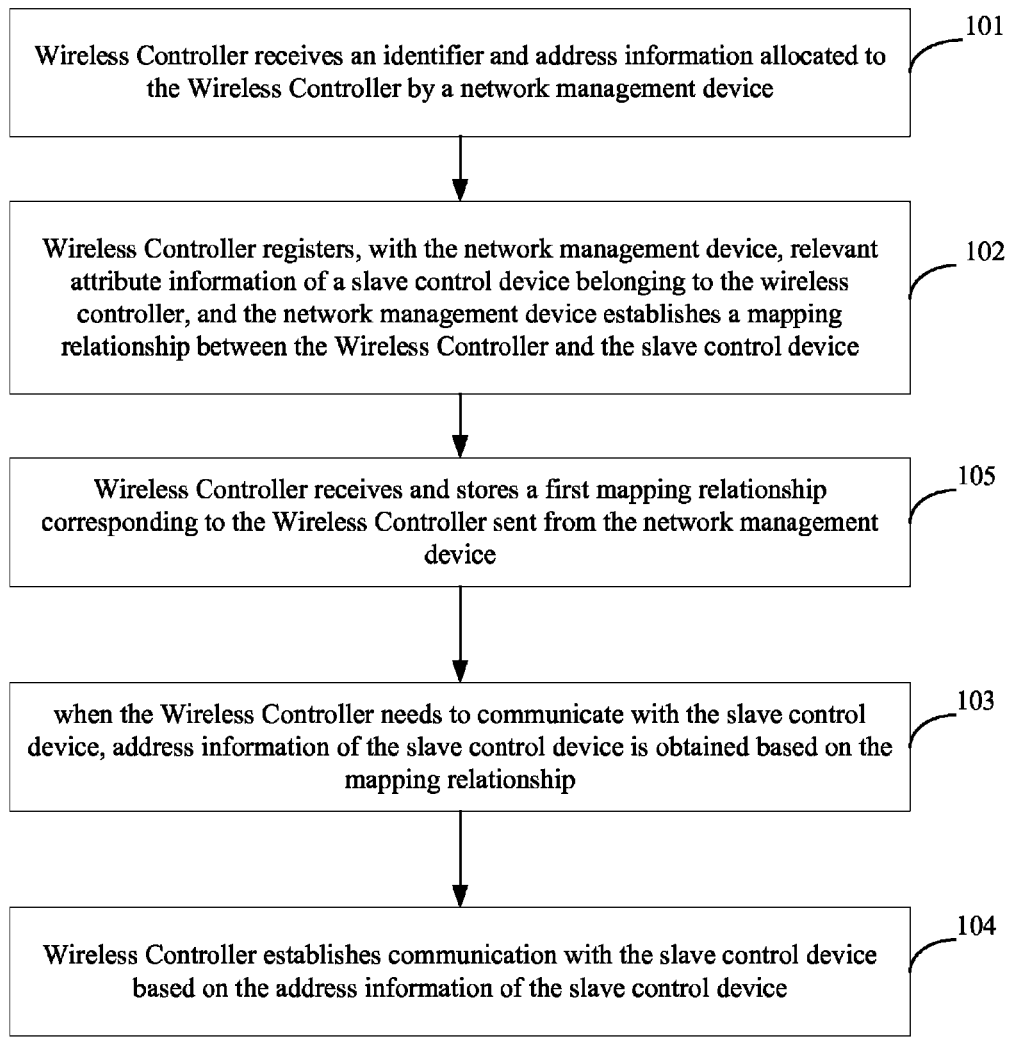
FIG. 2 is a flowchart of another communication method for a wireless controller according to the disclosure.

Referring to FIG. 2, FIG. 2 shows another method embodiment of the disclosure. Different from the above embodiment, step 105 is added after step 102 in the embodiment.

In step 105, the Wireless Controller receives and stores a first mapping relationship corresponding to the Wireless Controller sent from the network management device.

In this step, the network management device sends, to each Wireless Controller, the mapping relationship corresponding to the Wireless Controller, and the mapping relationship here is called the first mapping relationship herein.

Thus, for the step 103 in the embodiment, the Wireless Controller searches for address information of a first RAT control module or a first Wireless Controller in the stored first mapping relationship.

Based on the first mapping relationship, the mapping table of Wireless Controller may be established in the Wireless Controller.

Figure 3:
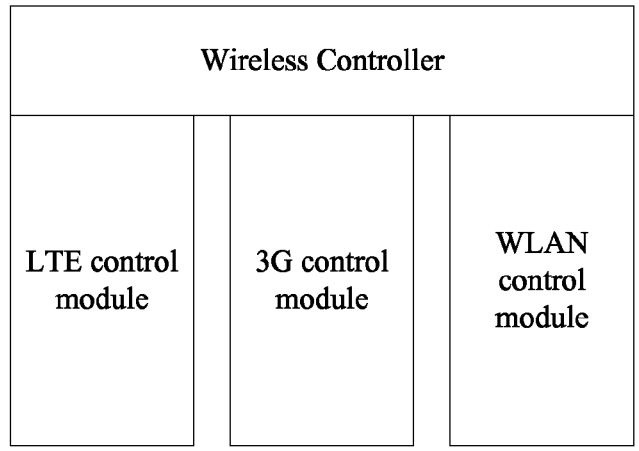
FIG. 3 is a diagram of implementing Wireless Controller through single-server according to the disclosure.

It should be noted that, there are two implementations for the Wireless Controller:

(1) Implementation with single-server. As shown in FIG. 3, a plurality of RAT control modules are loaded on a same server in the form of software protocol stack, and the server is controlled by the Wireless Controller to which the plurality of RAT control modules belong.

Figure 4:
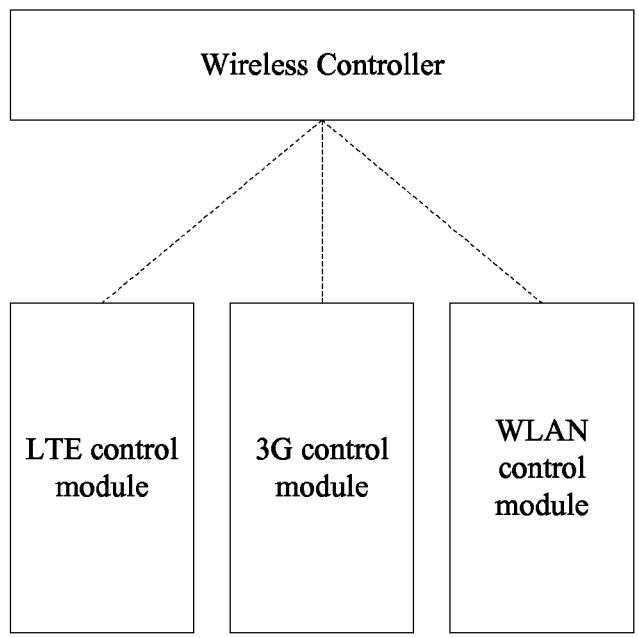
FIG. 4 is a diagram of implementing Wireless Controller through multi-server according to the disclosure.

(2) Implementation with multi-server. As shown in FIG. 4, respective RAT control modules use independent servers, and the Wireless Controller controls respective servers in a master-slave mode.

In the implementation (1), it is needed to establish and maintain, in the Wireless Controller, the mapping relationship between the IDs of RAT control modules and the resources (for example, port number in the Server, resource board ID of the Server) used by the RAT control modules, and the mapping relationship may be expressed through Table 3.

TABLE 3

Mapping table in Wireless Controller implemented through single-server Wireless Controller ID

| Index1 | MME1 ID | Source ID1 |
| Index2 | MME2 ID | Source ID2 |
| Index3 | SGSN ID | Source ID3 |
| Index4 | AC ID | Source ID4 |

In the implementation (2), it is needed to establish and maintain, in the Wireless Controller, the mapping relationship between the IDs of RAT control modules and the IP addresses of RAT control modules, and the mapping relationship may be expressed through Table 4.

TABLE 4

Mapping table in Wireless Controller implemented through multi-server Wireless Controller ID

| Index1 | MME1 ID | IP 1 |
| Index2 | MME2 ID | IP 2 |
| Index3 | SGSN ID | IP 3 |
| Index4 | AC | IP 4 |

Figure 5:
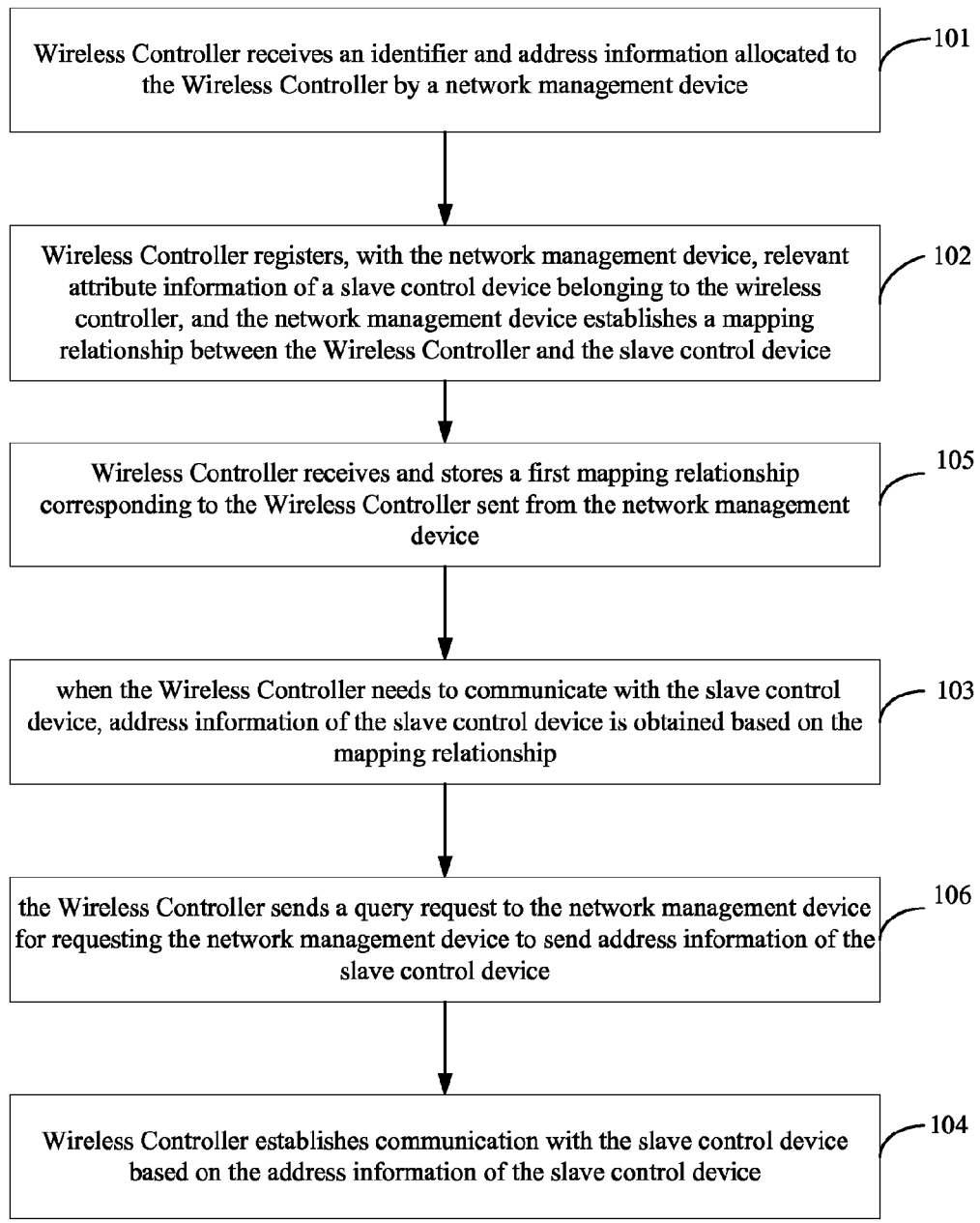
FIG. 5 is a flowchart of yet another communication method for a wireless controller according to the disclosure.

In addition, another method embodiment is provided in FIG. 5. The difference between this embodiment and the embodiment shown in FIG. 2 lies in that, the following step 106 is added if the Wireless Controller fails to find out a slave control device by searching in the first mapping relationship in step 103.

In step 106, the Wireless Controller sends a query request to the network management device for requesting the network management device to send address information of the slave control device.

According to the embodiment, in a case that the Wireless Controller fails to find out address information of the first RAT control module or the first Wireless Controller by searching in the first mapping relationship, it indicates that the first RAT control module or the first Wireless Controller communicating with the Wireless Controller is not under the jurisdiction of the Wireless Controller, thus, it requires to send the query request to the network management device for requesting the network management device to send the address information of the first RAT control module or the first Wireless Controller. This is because mapping relationships of all Wireless Controllers in the corresponding network are stored in the network management device.

Once receiving the query request, the network management device searches in the stored mapping relationships of all Wireless Controllers in the corresponding network, sends a query-response message to the Wireless Controller which initiates the query request, and sends the address information of the first RAT control module or the first Wireless Controller.

During the implementation process, if the network management device is not able to identify the Wireless Controller which sends the query request based on the signaling connection, the query request needs to carry a Wireless Controller ID.

Figure 6:
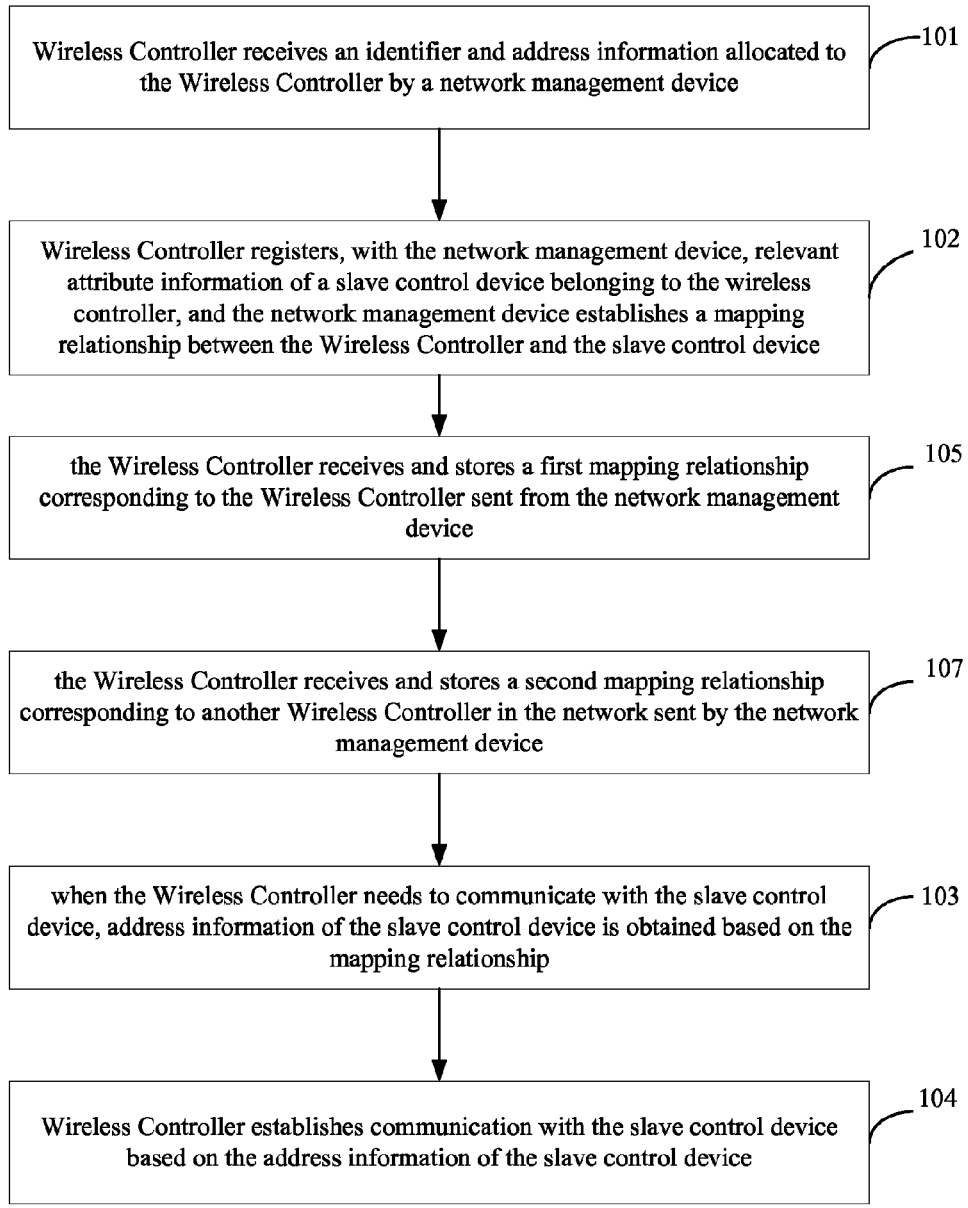
FIG. 6 is a flowchart of still another communication method for a wireless controller according to the disclosure.

Another method embodiment is provided in FIG. 6. The difference between this embodiment and the embodiment shown in FIG. 2 lies in that the following step 107 is added after step 105.

In step 107, the Wireless Controller receives and stores a second mapping relationship corresponding to another Wireless Controller in the network sent by the network management device.

According to the embodiment, besides sending mapping relationship corresponding to the Wireless Controller which initiates a registration request to the Wireless Controller, the network management device also sends mapping relationships corresponding to other Wireless Controllers in the network, so each registered Wireless Controller in the network may master mapping relationships corresponding to all Wireless Controllers in the network, thus, just through searching the second mapping relationships stored in the Wireless Controller, the Wireless Controller is informed of the address information of any slave RAT control module or slave Wireless Controller in the network, and needs not to send the corresponding query request to the network management device.

During the implementation process, the mode for the network management device to send the second mapping relationship may be configured specifically. For example, the network management device may send the second mapping relationship to the Wireless Controller in the network periodically. In addition, the network management device may alternatively send the second mapping relationship to the Wireless Controller in the network in response to a trigger of a particular event. For example, when the network management device finds that the maintained first mapping relationship of a certain Wireless Controller changes, the second mapping relationship including the changed first mapping relationship is sent to other Wireless Controllers in the network automatically. The disclosure is not limited in this aspect.

To understand the technical solution conveniently, it is illustrated through specific application scenarios in details.

For Wireless Controller implemented through single-server, the flow for the Wireless Controller to communication with a certain RAT control module in the network is as follows.

1. The network management device allocates an ID and an IP address for the Wireless Controller accessing the network;

2. Wireless Controller names the loaded RAT control module, a naming pattern is RAT ID, and a naming rule is based on the definition of 3GPP protocol.

3. Wireless Controller registers the slave RAT control module with the network management device, and registration information carries the RAT ID.

4. The network management device accomplishes the binding of the RAT control module to the IP address of the Wireless Controller, and establishes a mapping table, as shown in Table 1.

The network management device may send registration response information to the Wireless Controller, and the registration response information carries the mapping table information.

5. After receiving a registration response returned by the network management device, the Wireless Controller establishes a mapping table between the ID of RAT control module and the ID of the resource used by RAT control module (which is denoted as a Source ID) locally, as shown in Table 3. The Source ID may include information such as port number in the Server and resource board ID of the Server.

6. A signaling (e.g., non access service (NAS) signaling) from UE triggers a signaling interaction between Wireless Controllers, thus triggers a source Wireless Controller to address a destination RAT control module.

In this step, the RAT control module initiating the access request is called as destination RAT control module, and the Wireless Controller receiving the access request is called as source Wireless Controller.

If the destination RAT ID is in the source Wireless Controller, an interaction in the source Wireless Controller is performed;

otherwise, the source Wireless Controller sends a query request to the network management device, to query the address of the destination RAT control module, and the query request carries the RAT ID of the destination RAT control module.

If the network management device is not able to identify the source Wireless Controller sending the query request based on the signaling connection, the query request needs to further carry the Wireless Controller ID of the source Wireless Controller.

The network management device sends a query response message after a table lookup, which carries the RAT ID of the destination RAT control module and the Wireless Controller IP address of the destination Wireless Controller where the destination RAT control module locates.

7. When the source Wireless Controller sends information to the destination Wireless Controller, the information uses the address of the destination Wireless Controller and carries the destination RAT ID; if it needs to receive an acknowledgment message or the request response message, the information may further carries the RAT ID of the source RAT control module in the source Wireless Controller.

8. The destination Wireless Controller distributes the information to the corresponding destination RAT control module based on the destination RAT ID for processing.

For Wireless Controller implemented through multi-server, the flow of the Wireless Controller to communication with a certain RAT control module in the network is as follows.

1. The network management device allocates an ID and an IP address for the Wireless Controller in the network;

2. Wireless Controller names the RAT control modules loaded by respective Servers controlled by the Wireless Controller as RAT IDs, and allocates IPs for the Servers where the RAT control modules locate, which are denoted as RAT IPs.

3. Wireless Controller registers the slave RAT control module with the network management device, and registration information carries the RAT ID.

4. The network management device accomplishes the binding of the RAT control module to the IP address of the Wireless Controller IP, and establishes a mapping table, as shown in Table 1.

The network management device may send registration response information to the Wireless Controller, and the registration response information carries the mapping table information.

5. After receiving a registration response returned by the network management device, the Wireless Controller establishes a mapping table between the ID of RAT control module and the IP of the RAT control module locally, as shown in Table 4.

6. A signaling from UE triggers a signaling interaction between Wireless Controllers, thus triggers the source Wireless Controller to address a destination RAT control module.

If the ID of the destination RAT control module is in the source Wireless Controller, an interaction in the source Wireless Controller is performed;

otherwise, the source Wireless Controller sends a query request to the network management device, to query the address of the destination RAT control module, and the query request carries the RAT ID of the destination RAT control module.

When the source Wireless Controller performs the internal interaction, the source Wireless Controller obtains the RAT IP of the destination RAT control module based on Table 4.

When the source Wireless Controller sends the query request, the query request needs to further carry the Wireless Controller ID of the source Wireless Controller if the network management device is not able to identify the source Wireless Controller sending the query request based on the signaling connection.

The network management device sends a query response message after a table lookup, which carries the RAT ID of the destination RAT control module and the Wireless Controller IP address of the destination Wireless Controller where the destination RAT control module locates.

7. When the source Wireless Controller sends information to the destination Wireless Controller, the information uses the IP address of the destination Wireless Controller and carries the destination RAT ID; if it needs to receive an acknowledgment message or the request response message, the information may further carries the RAT ID of the source RAT control module in the source Wireless Controller.

8. The destination Wireless Controller obtains the corresponding RAT IP through table lookup based on the RAT ID of the destination RAT control module, and distributes the message to the corresponding server for processing.

A technical solution to implement Wireless Controller through single-server is provided according to an embodiment, which differs from the first application scenario in that the following different configuration is: (1) ID of the RAT control module is allocated by the network management device. (2) The allocation of IP address of Wireless Controller, RAT registration and binding may be performed in a same step. The processes are shown as below.

1. After accesses a network, the Wireless Controller sends a registration request to the network management device when loading the RAT control module, where the registration request carries an identifier of the resource used by RAT control module (which is denoted as a Source ID). The identifier of the resource may include information such as internal port number of the Server and resource board ID of the Server.

2. The network management device allocates an ID and an IP address for the Wireless Controller, and names the RAT control module, which is denoted as a RAT ID, then establishes a mapping table among Wireless Controller ID, Wireless Controller IP, and Source ID and RAT ID, as shown in Table 5.

TABLE 5

A managed Mapping table when the network management device allocates RAT ID
Wireless Controller ID
IP Address

| Index1 | MME1 ID | Source ID1 |
|---|---|---|
| Index2 | MME2 ID | Source ID2 |
| Index3 | SGSN ID | Source ID3 |
| Index4 | AC ID | Source ID4 |

A managed Mapping table when the network management device allocates RAT ID

The network management device returns a registration response carrying Wireless Controller ID, Wireless Controller IP, Source ID and RAT ID.

3. After receiving a registration response returned by the network management device, the Wireless Controller establishes a mapping table between the RAT control module ID and the identifier of resource used by the control module (such as internal port number of the Server and resource board ID of the Server), as shown in Table 3.

4. A signaling of UE triggers a signaling interaction between Wireless Controllers, thus triggers addressing by a source Wireless Controller for a destination RAT control module.

If the destination RAT ID is in the source Wireless Controller, an interaction in the Wireless Controller is performed;

otherwise, Wireless Controller sends a query request to the network management device, to query the address of the destination RAT control module, where the query request carries the RAT ID of the destination RAT control module.

If the network management device is not able to identify the source Wireless Controller sending the query request based on the signaling connection, the query request needs to further carry the Wireless Controller ID of the source Wireless Controller.

The network management device sends a query request response after a table lookup, which carries RAT ID of the destination RAT control module and the Wireless Controller IP address of the destination Wireless Controller where the destination RAT control module lies.

5. When sending a message to the destination Wireless Controller, the source Wireless Controller uses the destination Wireless Controller address and carries the destination RAT ID; if it needs to receive an acknowledgment message or the query response message, the source Wireless Controller may further carries the RAT ID of the source RAT control module.

6. The destination Wireless Controller distributes the message to the corresponding destination RAT control module for processing based on the destination RAT ID.

Figure 7:
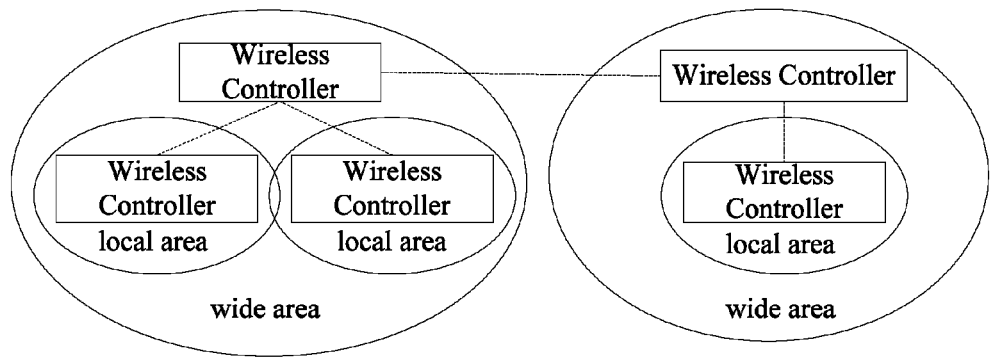
FIG. 7 is a structure diagram of a control entity of a master-slave Wireless Controller according to the disclosure.

The above solution may also be applied to a case of the control entities in master-slave distribution. As shown in FIG. 7, the master and slave control entities (e.g., Wireless Controller) are differentiated on basis of the sizes of service areas, for example, the slave control entity implements the management control on a local area (e.g., control entity within the scope of a city), and the master control entity implements the control on a wide area (e.g., all municipal control entities within the scope of a province).

In this application scenario, the processing flow between the master and slave Wireless Controllers is as follows.

1. The network management device allocates an ID and an IP address for the master Wireless Controller accessing the network.

2. The master Wireless Controller allocates IP and ID for the loaded slave Wireless Controller, which are denoted as slave Wireless Controller IP and slave Wireless Controller ID respectively.

3. The master Wireless Controller registers the slave Wireless Controller with the network management device, by carrying the slave Wireless Controller ID.

4. The network management device accomplishes the binding of the slave Wireless Controller ID to the master Wireless Controller IP address, and establishes a mapping table, as shown in Table 2.

5. After receiving a registration response returned by the network management device, the master Wireless Controller establishes a mapping table between the slave Wireless Controller ID and the slave Wireless Controller IP locally, as shown in Table 6.

TABLE 6

Mapping table in the master Wireless Controller under master-slave architecture
Wireless Controller ID

| Index1 | slave Wireless Controller 1 ID | IP 1 |
|---|---|---|
| Index2 | slave Wireless Controller 2 ID | IP 2 |

6. A signaling from UE triggers a signaling interaction between the slave Wireless Controllers, and triggers the master Wireless Controller to address a destination (slave) Wireless Controller;

If the destination Wireless Controller is in the same master Wireless Controller, an interaction in the master Wireless Controller is performed;

otherwise, the master Wireless Controller sends a query request to the network management device, to query the address of the destination Wireless Controller, and the query request carries the slave Wireless Controller ID.

During the internal interaction, the master Wireless Controller obtains the slave Wireless Controller IP based on Table 6, and sends the IP as the signaling.

When sending the query request, if the network management device is not able to identify the master Wireless Controller sending the query request based on the signaling connection, the query request needs to further carry Wireless Controller ID of the master Wireless Controller.

The network management device sends a query request response after looking up Table 2, where the response carries Wireless Controller ID of the slave Wireless Controller and address of the master Wireless Controller to which the slave Wireless Controller belongs.

7. When the source (slave) Wireless Controller sends the signaling to the destination (slave) Wireless Controller, the signaling uses the address of the master Wireless Controller to which the slave Wireless Controller belongs, and carries the Wireless Controller ID of the destination (slave) Wireless Controller;

if the source (slave) Wireless Controller needs to receive an acknowledgment message or a query response message, the signaling may carry the Wireless Controller ID of the source (slave) Wireless Controller.

8. The master Wireless Controller receiving the signaling obtains the IP of the slave Wireless Controller through table lookup based on the Wireless Controller ID of the destination (slave) Wireless Controller, and distributes the information to the corresponding slave Wireless Controller for processing.

In this application scenario, signaling transmission is performed between slave Wireless Controllers, and an addressing operation is performed by the master Wireless Controller.

It should be noted that, in the above application scenarios, the network management device sends to the Wireless Controller initiating the registration request not only the mapping relationship corresponding to Wireless Controller, but also the mapping relationships corresponding to other Wireless Controllers in the network. Thus, each registered Wireless Controller in the network may know mapping relationships of all Wireless Controllers in the network, and only needs to search in the stored second mapping relationships to obtain address information of any slave RAT control module or slave Wireless Controller in the network, without sending the corresponding query request to the network management device.

Figure 8:
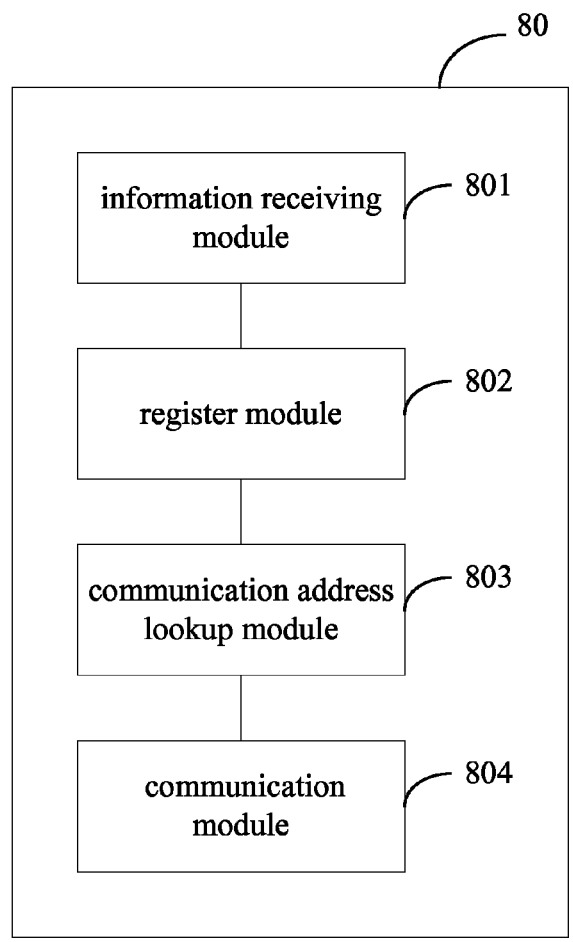
FIG. 8 is a block diagram of a wireless controller according to a first embodiment of the disclosure.

Referring to FIG. 8, FIG. 8 is a structural diagram of a wireless controller according to an embodiment of the disclosure. The Wireless Controller 80 may include an information receiving module 801, a register module 802, a communication address lookup module 803, and a communication module 804.

The information receiving module 801 is configured to receive an identifier and address information allocated to the wireless controller by a network management device after the wireless controller accesses a network;

The register module 802 is configured to register attribute information of a slave control device belonging to the wireless controller with the network management device, and the network management device establishes a mapping relationship between the wireless controller and the slave control device;

where the slave control device belonging to the wireless controller may include a slave RAT control module or a slave Wireless Controller. Thus, relevant information of the slave control device or the slave Wireless Controller may be registered with the network management device through the register module 802, and the network management device establishes the mapping relationship between the Wireless Controller and the slave RAT control module or the slave Wireless Controller.

The communication address lookup module 803 is configured to search for address information of the slave control device based on the mapping relationship, when communicating with the slave control device; for example, when it needs to communicate with a first RAT control module or a first Wireless Controller, the address information of the first RAT control module or the first Wireless Controller is search for based on the mapping relationship.

The communication module 804 is configured to establish communication with the slave control device based on the address information of the slave control device; for example, based on the address information of the first RAT control module or the first Wireless Controller, communication with the first RAT control module or the first Wireless Controller is established.

According to the embodiment, the network management device establishes the mapping relationship for Wireless Controller in the network, connection between Wireless Controller and the slave RAT control module or the slave RAT controller belonging to the Wireless Controller is represented through the mapping relationship, thus Wireless Controller obtains the address information of any RAT control module or RAT controller through the mapping relationship and communicates with the corresponding RAT control module or RAT controller accordingly.

Figure 9:
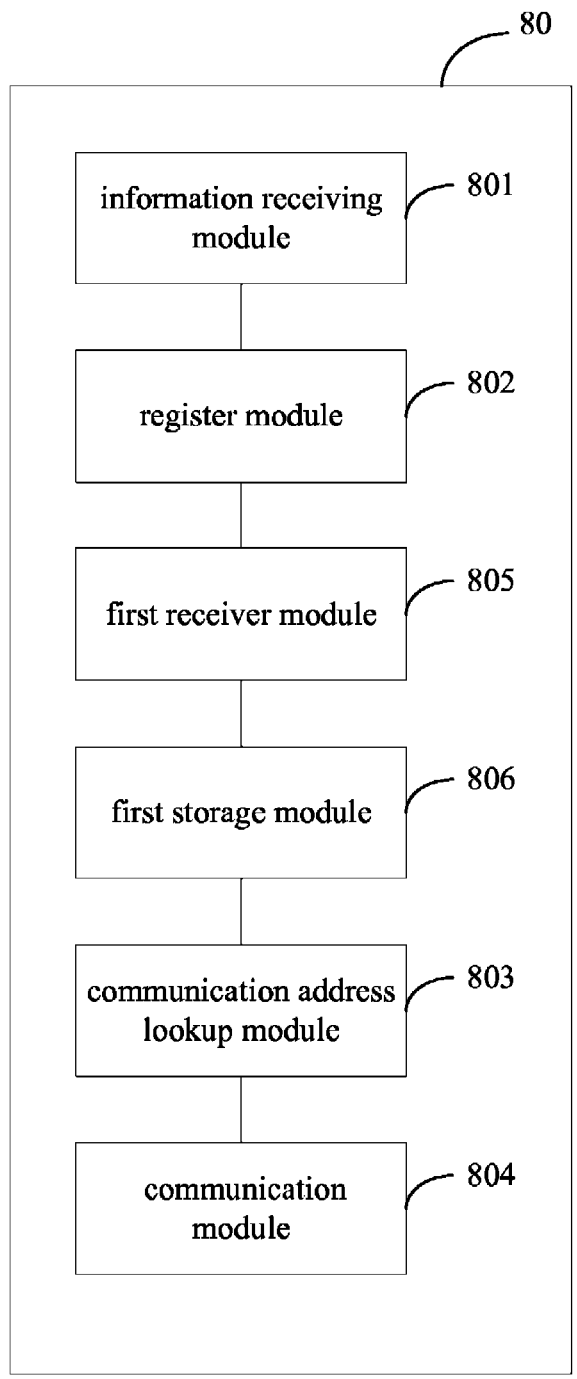
FIG. 9 is a block diagram of a wireless controller according to a second embodiment of the disclosure.

According to another embodiment of the Wireless Controller in the disclosure, as shown in FIG. 9, the Wireless Controller 80 may further include:

a first receiver module 805, configured to receive a first mapping relationship corresponding to the Wireless Controller sent by the network management device; and a first storage module 806, configured to store the first mapping relationship.

According to the embodiment, Wireless Controller may receive, via the first receiver module 805, the mapping relationship corresponding to the Wireless Controller sent by the network management device, which is called the first mapping relationship. Thus, Wireless Controller may obtain related information about the slave RAT control module belonging to the Wireless Controller or the slave Wireless Controller belonging to the Wireless Controller through searching in the first mapping relationship.

Figure 10:
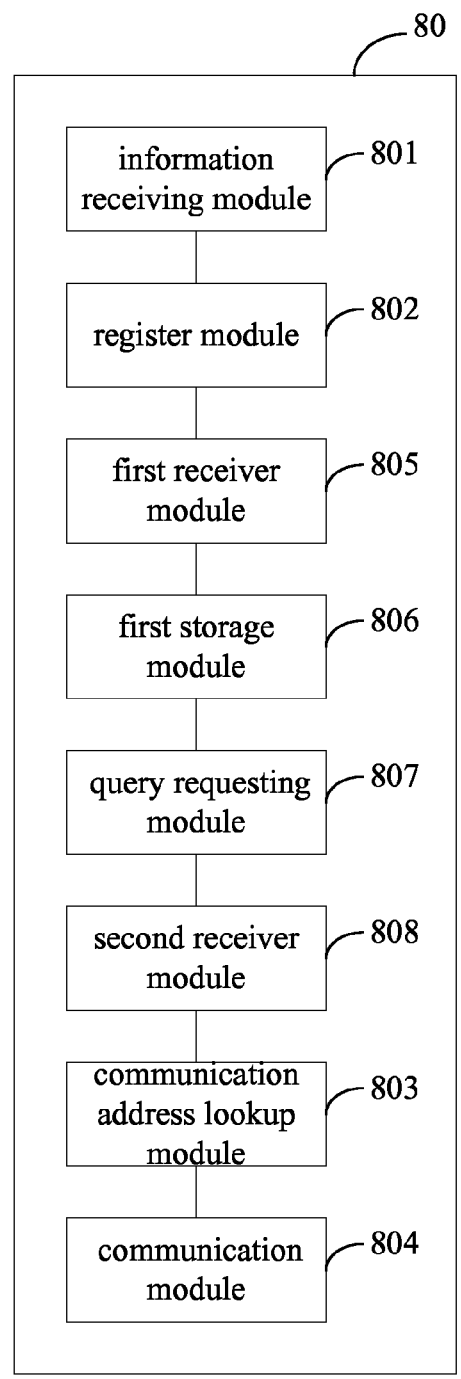
FIG. 10 is a block diagram a wireless controller according to a third embodiment of the disclosure.

According to another embodiment of the Wireless Controller in the disclosure, as shown in FIG. 10, the Wireless Controller 80 may further include:

a query requesting module 807, configured to send a query request to the network management device in a case that the address information of the first RAT control module or the first Wireless Controller is not found by searching in the first mapping relationship, for requesting the network management device to send address information of the first RAT control module or the first Wireless Controller; and a second receiver module 808, configured to receive address information of the first RAT control module or the first Wireless Controller sent by the network management device.

According to the embodiment, in a case that Wireless Controller fails to find the address information of the first RAT control module or the first Wireless Controller by searching in the first mapping relationship, which means that the first RAT control module or the first Wireless Controller communicating with the Wireless Controller is not within the jurisdiction of the Wireless Controller, the query requesting module 807 thus needs to be triggered to send the query request to the network management device, requesting the network management device to send address information of the first RAT control module or the first Wireless Controller. This is because the network management device stores mapping relationships of all Wireless Controllers in the corresponding network.

Figure 11:
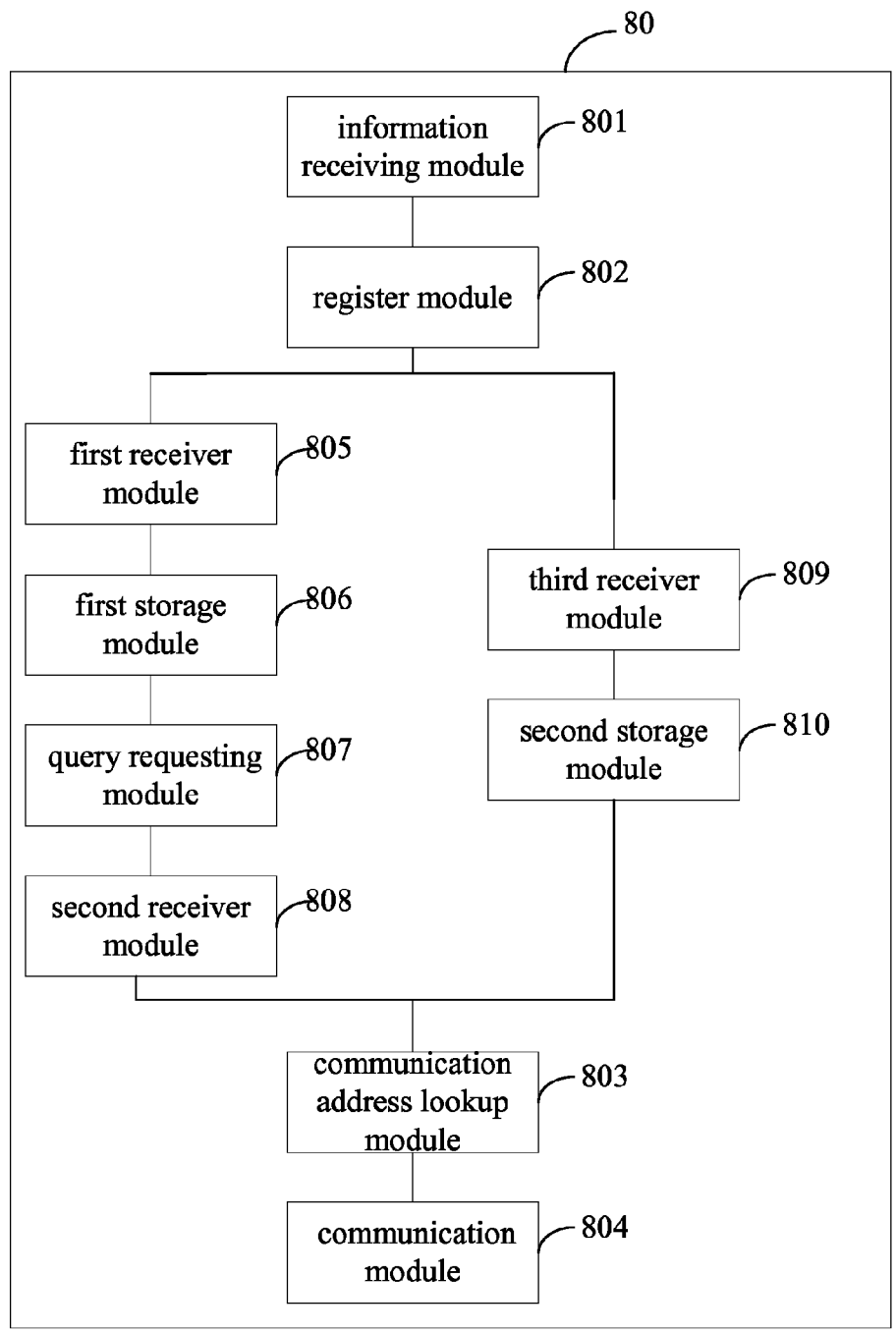
FIG. 11 is a block diagram of a wireless controller according to a fourth embodiment of the disclosure.

According to another embodiment of the Wireless Controller in the disclosure, as shown in FIG. 11, the Wireless Controller 80 may further include:

a third receiver module 809, configured to receive a second mapping relationship corresponding to another wireless controller in the network sent by the network management device; and a second storage module 810, configured to store the second mapping relationship.

According to the embodiment, the network management device sends to the Wireless Controller initiating the registration request not only a mapping relationship corresponding to the Wireless Controller, but also the mapping relationships corresponding to other Wireless Controllers in the network. Thus, each registered Wireless Controller in the network may know mapping relationships of all Wireless Controllers in the network, and only needs to search in the stored second mapping relationship to obtain address information of any slave RAT control module or slave Wireless Controller in the network, without sending the corresponding query request to the network management device.

In addition, there may be two ways to implement Wireless Controller.

(1) Implementation with single-server, i.e., a plurality of RAT control modules are loaded on a same server in the form of software protocol stack, and the server is controlled by the Wireless Controller to which the plurality of RAT control modules belong.

(2) Implementation with multi-server, i.e., a plurality of RAT control modules use independent servers, and the Wireless Controller controls respective servers in a master-slave mode.

Figure 12:
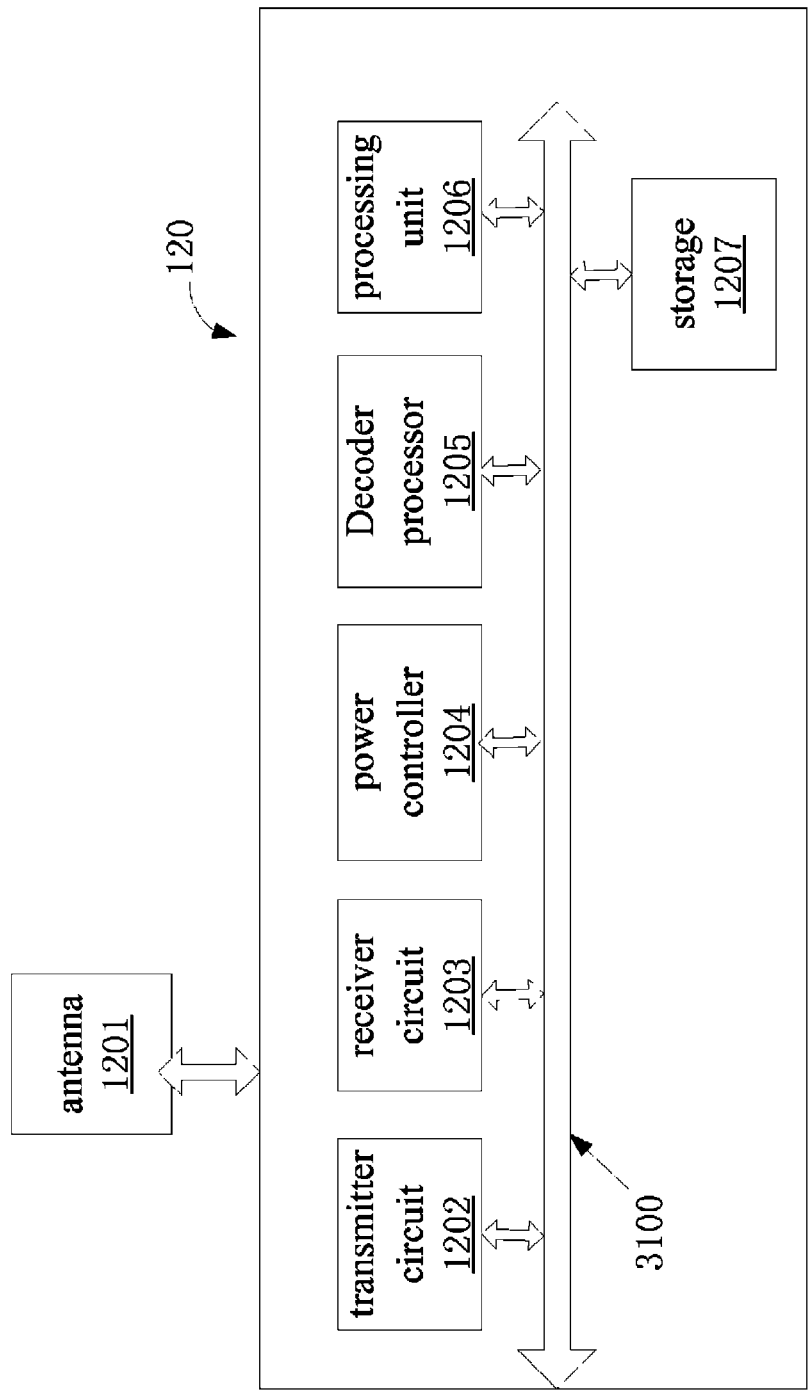
FIG. 12 is a structure diagram of a specific implementation of a wireless controller of the disclosure.

It should be noted that, a specific implementation of Wireless Controller according to the embodiment shown in FIG. 12 is further provided. According to the embodiment, Wireless Controller 120 includes: a transmitter circuit 1202, a receiver circuit 1203, a power controller 1204, a decoder processor 1205, a processing unit 1206, storage 1207 and an antenna 1201. The processing unit 1206, which may also called as CPU, controls operation of device 120. The storage 1207 may include read only memory and random access memory, and provides instructions and data to the processing unit 1206. A part of the storage 1207 may further include nonvolatile random access memory (NVRAM). In a specific application, the device 120 may be embedded in or may be of itself a wireless communication device such as mobile phone, and may include a carrier accommodating the transmitter circuit 1202 and the receiver circuit 1203, to allow data transmitting and receiving between the device 120 and a remote location. The transmitter circuit 1202 and the receiver circuit 1203 may be coupled to the antenna 1201. Respective components of the device 120 are coupled together through a bus system 3100, where the bus system 3100 includes a power bus, a control bus and a state signal bus besides a data bus. To be clear, all buses are marked collectively as the bus system 3100. The device 120 may further include the processing unit 1206 configured to process the signal, the power controller 1204 and the decoder processor 1205. Specifically, the decoder processor 1205 and the processing unit 1206 may be integrated into a whole in different products.

The processor may implement or execute respective steps and logical block diagrams in the method embodiments of the disclosure. A general-purpose processor may be a microprocessor or any conventional processor, decoder and so on. Steps in the method according to the embodiments of the disclosure may be embodied through execution by hardware processor, or through execution by combination of hardware and software modules in the decoder processor. The software module may locate in a mature storage medium in the field such as random access memory, flash memory, read only memory, programmable read only memory, electrically erasable programmable memory, or register. The storage medium locates in the storage 1207, the decoder unit or processor unit reads information in the storage 1207 and executes the steps in the above method in conjunction with the hardware.

In specific implementation, the foregoing information receiving module 801 may be a part of the receiver circuit 1203 or a separate receiver circuit; the register module 802, the communication address lookup module 803, and the communication module 804, may be a part of the processing unit 1206 or a separate processing unit each.

Those skilled in the art may realize that, the unit and algorithm step of the described example according to the embodiments of the disclosure may be implemented through electronic hardware, or combination of computer software and electronic hardware. Whether the function is executed through hardware or software depends on the specific application of the technical solution and a design constraint. Those skilled in the art may implement the described function through different methods for each specific application, and the implementation should not be considered beyond the scope of the disclosure.

Those skilled in the art may clearly understand that, for convenience and concision of description, the operation process of the described system, device and unit may refer to a corresponding process according to the forgoing method embodiment, which is not described again here.

According to the embodiments of the disclosure, it should be noted that, the described system, device and method, may be implemented through another mode. For example, the described device embodiment is just illustrative; the division of unit is just a type of logical functional division, and there may be another division mode in practical implementation; multiple units or components may be combined or integrated into another system, or some features may be neglected or not executed. Another point is that, the displayed or discussed mutual coupling, direct coupling or communication connection may be achieved through some interfaces, and indirect coupling or communication connection of devices or units may be electrical, mechanical, or in another form.

The unit described as a separate part may be or may not be separate physically, and the component displayed as the unit may be or may not be the physical unit, i.e., the component may be located at a place, or may be distributed in multiple network units. Part of or all the units may be chosen based on practical requirement to implement the objective of the embodiment.

In addition, the respective function units according to the embodiments of the disclosure may be integrated into one processing unit, or may exists separately and physically, or two or more units may be integrated into one unit.

If the function is implemented in the form of software function unit and is sold or used as an independent product, the function may be stored in a computer readable storage medium. Based on this understanding, the essential technical solution of the disclosure or the part contributing to the conventional technology or a part of the technical solution may be embodied in the form of software product, and the computer software product is stored in a storage medium, which includes some instructions to allow a computer equipment (may be a personal computer, a server, or a network equipment, etc.) or processor (processor) to execute all or part of the steps in the method according to the embodiments of the disclosure. The forgoing storage medium includes various mediums capable of storing a program code such as U-disk, mobile hard disk, read-only memory (ROM), random access memory (RAM), disk or compact disk.

What is claimed is:

1. A communication method for a wireless controller, comprising:
   receiving, by the wireless controller, an identifier and address information allocated to the wireless controller by a network management device;
   registering, by the wireless controller, attribute information for Radio Access Technology (RAT) of a slave control device belonging to the wireless controller with the network management device, wherein the network management device establishes a mapping relationship between the wireless controller and the slave control device;

searching for address information of the slave control device based on the mapping relationship when the wireless controller needs to communicate with the slave control device; and establishing, by the wireless controller, communication with the slave control device based on the address information of the slave control device.

2. The method according to claim 1, wherein after the network management device establishes the mapping relationship between the wireless controller and the slave control device, the method further comprises:

receiving and storing, by the wireless controller, a first mapping relationship corresponding to the wireless controller sent from the network management device.

3. The method according to claim 2, further comprising:

in a case that the wireless controller fails to find the address information of the slave control device by searching in the first mapping relationship, sending a query request to the network management device for requesting the network management device to send the address information of the slave control device.

4. The method according to claim 2, wherein after the network management device establishes the mapping relationship between the wireless controller and the slave control device, the method further comprises:

receiving and storing, by the wireless controller, a second mapping relationship corresponding to another wireless controller sent by the network management device.

5. The method according to claim 1, wherein the slave control device comprises a slave wireless access control module or a slave wireless controller.

6. The method according to claim 1, wherein the slave control device comprises a plurality of slave wireless access control modules, the slave wireless access control modules are loaded on a same server, and the wireless controller to which the slave wireless access control modules belong controls the server.

7. The method according to claim 1, wherein the slave control device comprises a plurality of slave wireless access control modules, the slave wireless access control modules are loaded on independent servers, respectively, and the wireless controller to which the slave wireless access control modules belong controls the independent servers in a master-slave mode.

8. A wireless controller comprising:

a memory having code stored therein, when the code is executed by a processor, the memory is configured into a plurality of modules comprising:

an information receiving module, configured to receive an identifier and address information allocated to the wireless controller by a network management device;

a register module, configured to register attribute information for Radio Access Technology (RAT) of a slave control device belonging to the wireless controller with the network management device, wherein the network management device establishes a mapping relationship between the wireless controller and the slave control device;

a communication address lookup module, configured to search for address information of the slave control device based on the mapping relationship, when communicating with the slave control device; and a communication module, configured to establish communication with the slave control device based on the address information of the slave control device.

9. The wireless controller according to claim 8, further comprising:

a first receiver module, configured to receive a first mapping relationship corresponding to the wireless controller sent by the network management device; and a first storage module, configured to store the first mapping relationship.

10. The wireless controller according to claim 9, further comprising:

a query requesting module, configured to send a query request to the network management device for requesting the network management device to send the address information of the slave control device in a case that the wireless controller fails to find the address information of the slave control device by searching in the first mapping relationship; and a second receiver module, configured to receive the address information of the slave control device sent by the network management device.

11. The wireless controller according to claim 9, further comprising:

a third receiver module, configured to receive a second mapping relationship corresponding to another wireless controller sent by the network management device; and a second storage module, configured to store the second mapping relationship.

12. The wireless controller according to claim 8, wherein the slave control device comprises a slave wireless access control module or a slave wireless controller.

13. The wireless controller according to claim 8, wherein the slave control device comprises a plurality of slave wireless access control modules, the slave wireless access control modules are loaded on a same server, and the wireless controller to which the slave wireless access control modules belong controls the server.

14. The wireless controller according to claim 8, wherein the slave control device comprises a plurality of slave wireless access control modules, the slave wireless access control modules are loaded on independent servers, respectively, and the wireless controller to which the slave wireless access control modules belong controls the independent servers in the master-slave mode.

15. A wireless controller comprising:

a receiver circuit configured to receive an identifier and address information allocated to the wireless controller by a network management device; and a processor, configured to:

register attribute information for Radio Access Technology (RAT) of a slave control device belonging to the wireless controller with the network management device, wherein the network management device establishes a mapping relationship between the wireless controller and the slave control device;

search for address information of the slave control device based on the mapping relationship, when communicating with the slave control device; and establish communication with the slave control device based on the address information of the slave control device.

16. The wireless controller according to claim 15, wherein:

the receiver circuit is further configured to receive a first mapping relationship corresponding to the wireless controller sent by the network management device; and the wireless controller further comprises a storage configured to store the first mapping relationship.

17. The wireless controller according to claim 16, wherein:
- the processor is further configured to send a query request to the network management device for requesting the network management device to send the address information of the slave control device in a case that the wireless controller fails to find the address information of the slave control device by searching in the first mapping relationship; and
- the receiver circuit is further configured to receive the address information of the slave control device sent by the network management device.

18. The wireless controller according to claim 16, wherein:
- the receiver circuit is further configured to receive a second mapping relationship corresponding to another wireless controller sent by the network management device; and
- the storage is further configured to store the second mapping relationship.

19. The wireless controller according to claim 15, wherein the slave control device comprises a slave wireless access control module or a slave wireless controller.

20. The wireless controller according to claim 19, wherein the slave control device comprises a plurality of slave wireless access control modules;
- wherein the slave wireless access control modules are loaded on a same server, and the wireless controller to which the slave wireless access control modules belong controls the server; or
- wherein the slave wireless access control modules are loaded on independent servers, respectively, and the wireless controller to which the slave wireless access control modules belong controls the independent servers in the master-slave mode.

* * * * *